(12) United States Patent
Christgen et al.

(10) Patent No.: US 9,004,023 B2
(45) Date of Patent: Apr. 14, 2015

(54) VARIABLE VALVE TRAIN FOR AN INTERNAL COMBUSTION ENGINE

(71) Applicant: Schaeffler Technologies AG & Co. KG, Herzogenaurach (DE)

(72) Inventors: Wolfgang Christgen, Seukendorf (DE); Michael Schober, Vestenbergsgreuth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 95 days.

(21) Appl. No.: 13/784,917

(22) Filed: Mar. 5, 2013

(65) Prior Publication Data
US 2013/0247851 A1    Sep. 26, 2013

(30) Foreign Application Priority Data
Mar. 23, 2012 (DE) .......................... 10 2012 204 682

(51) Int. Cl.
*F01L 1/34* (2006.01)
*F02D 13/02* (2006.01)
*F02D 41/00* (2006.01)
*F02M 25/07* (2006.01)

(52) U.S. Cl.
CPC ............. *F01L 1/34* (2013.01); *F01L 2820/032* (2013.01); *F02D 2041/001* (2013.01); *F02M 25/0752* (2013.01); *F02D 13/0273* (2013.01); *Y02T 10/18* (2013.01)

(58) Field of Classification Search
CPC .. F01L 1/34; F01L 2820/032; F02D 13/0273; F02D 2041/001; Y02T 10/18; F02M 25/0752
USPC ............................................ 123/90.16, 90.39
See application file for complete search history.

(56) References Cited

U.S. PATENT DOCUMENTS

2005/0252484 A1* 11/2005 Vanderpoel et al. .......... 123/321
2007/0074690 A1*  4/2007 Yoshikawa ................. 123/90.16

FOREIGN PATENT DOCUMENTS

DE         10235402         2/2004

* cited by examiner

*Primary Examiner* — Zelalem Eshete
(74) *Attorney, Agent, or Firm* — Volpe and Koenig, P.C.

(57) ABSTRACT

A variable lift valve train for an internal combustion engine, including a pivoted lever with a transmission surface on one end, a counter running surface in a central region and, on a further end, a support element and a contact element, the transmission surface has a zero lift path and, adjoining the zero lift path in lever pivoting direction, a lift path, the transmission surface being in contact with a valve opener, the counter running surface being loaded by at least one lift cam, the support element being guided on a lever guide section, the contact element, for adjusting a valve lift being loaded by an adjusting device in direction of the lever guide section, and the valve train including directly in a region of the pivoted lever, an effective and optionally additionally actuable element for creating an additional valve lift during a base circle phase of the lift cam.

6 Claims, 2 Drawing Sheets

VARIABLE VALVE TRAIN FOR AN INTERNAL COMBUSTION ENGINE

INCORPORATION BY REFERENCE

The following documents are incorporated herein by reference as if fully set forth: German Patent Application No. DE 102012204682.8, filed Mar. 23, 2012.

BACKGROUND

A variable lift valve train for an internal combustion engine with internal combustion, comprising a pivoted lever with a transmission surface on one end, a counter running surface in a central region and, on a further end, a support element and a contact element, said transmission surface comprising a zero lift path and, adjoining said zero lift path in lever pivoting direction, a lift path, said transmission surface being in contact with a valve opener, said counter running surface being loaded by at least one lift cam, said support element being guided on a lever guide path, and said contact element, for adjusting the valve lift being loaded by an adjusting device in direction of said lever guide path.

A valve train of the above-noted type is shown in FIG. 1 of DE 102 35 402 A1 and is used under the name of "Valvetronic" by BMW AG as a fully variable valve controlling means. A drawback of this valve train is that it does not enable realization of an additional valve lift in the cam base circle phase, for instance for an internal exhaust gas return. As a result, one must have recourse to complex further measures such as adjusting-angle limited VVT systems, friction enhancing switchable lever drives or additional valves.

SUMMARY

It is an object of the invention to provide a valve train of the above-noted type in which an additional partial cam lift is enabled in the base circle phase using simple measures.

The above object is achieved according to the invention by the fact that, directly in a region of the pivoted lever, the valve train comprises an effective and optionally additionally actuable element for creating an additional lift during a base circle phase of the lift cam. According to a particularly preferred embodiment of the invention, it is provided to arrange in the base circle of the lift cam, at least one additional cam elevation, i.e. a low lift cam, as a substantial means for creating an additional valve lift, and for actuating or shutting off the additional cam through an appropriate design of the angle of pivot and of the transmission surface of the pivoted lever.

An activation of the additional cam elevation, for instance for feeding residual gas through an exhaust valve that is then temporarily opened during the suction cycle, does not prejudice the maximum lift of the gas exchange valve concerned. However, if the additional lift is not activated, for instance if no residual gas return is desired, a slight loss in the full lift is accepted because, to put it simply, the low lift curve must be swallowed by the high lift curve.

The invention can be used in a controlled manner for the internal residual gas return in (boosted) quantity or quality controlled internal combustion engines.

It is both imaginable and intended to avoid the aforesaid slight loss in the lift. For this purpose, the pivoted lever must be displaced before run-on flank contact of the lift cam by its adjusting device, that is made preferably as a segment-like pivoting eccentric part, via the transmission surface of the lift cam into the contact position "zero lift activating section" and following this, after cam run-off flank contact but before additional lift cam contact, into the contact position "zero lift shutting off section."

For reducing the valve train friction, according to a further dependent claim, at least one of the components counter running surface, support element, contact element, is made as a rotating and optionally rolling-bearing mounted roller. The contact region on the valve opener may also be configured as a roller. The use of respective sliding surfaces in both cases keeps the costs and the assembly work within comparatively narrow limits and at the same time reduces the lever mass to a minimum.

The valve opener, on which the transmission surface of the pivoted lever acts, can be at least one finger lever or oscillating lever. Alternatively, it is also feasible to use a tappet.

BRIEF DESCRIPTION OF THE DRAWINGS

Referring now to the drawings.

DETAILED DESCRIPTION OF THE PREFERRED EMBODIMENTS

Figure 1:
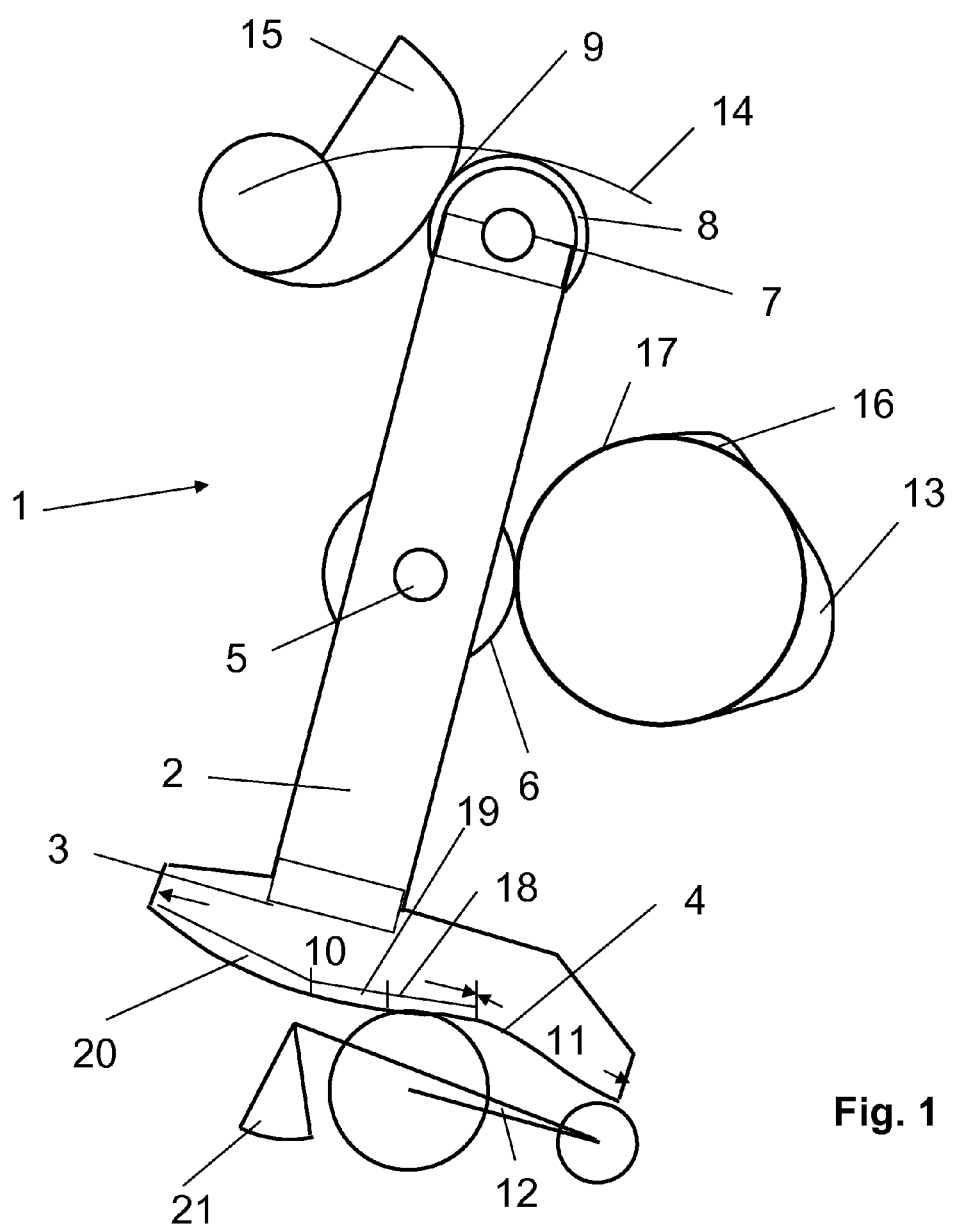
FIG. 1. shows a schematic top view of the valve train.

In FIG. 1 is represented a fully variable valve train 1 of an internal combustion engine which valve train corresponds in its basic structure and function to the BMW Valvetronic system.

The valve train 1 comprises an elongate pivoted lever 2. This lever comprises on a lower end 3 an integrally connected transmission surface 4 that comprises a zero lift path and, following this in lever pivoting direction, a lift path 10, 11. The transmission surface 4 is in contact with a valve opener 12, configured in the present case a finger lever that rests in its right hand side region in the present drawing, on a support element, not shown.

The aforesaid zero lift path 10, as viewed from the lift path 11, is made up of a zero lift activating section, a zero lift shutting off section, and a residual zero lift section 18, 19 and 20 arranged behind one another. In FIG. 1, the zero lift activating section 18 is in contact with the valve opener 12.

The pivoted lever 2 further comprises in a central region 5, a counter running surface 6, configured in the present case as a roller that is loaded by a lift cam 13.

On a further end 7, the pivoted lever 2 comprises a support element 8 and a contact element 9. The support element 8 is guided on a circular arc-shaped lever guide path 14 and is made as a roller. The contact element 9 that is configured as a further roller is loaded by an adjusting device 15 towards the lever guide path 14, and the adjusting device 15 is configured as an oscillating eccentric part.

For obtaining an additional valve lift during a base circle phase 17 of the lift cam 13, for instance for realizing an internal exhaust gas return, the cam base circle 17 possesses an actuable element 16, i.e. an additional cam elevation as an element for realizing the additional valve lift.

Figure 3:
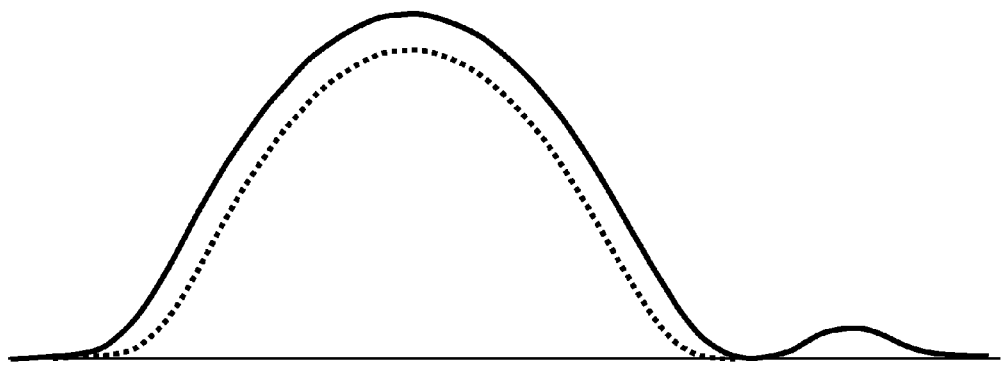

If it is desired to actuate the additional valve lift (s. also FIG. 3) simultaneously with a maximum valve lift, the pivoted lever 2 is turned by the adjusting device 15 only so far at its center of pivot on the further end 7 that, during the base circle phase 17 of the lift cam 13, only the zero lift activating surface 18 (s. also FIG. 1 bottom) is in contact with the valve opener 12. In the next following lift cam contact phase the pivoted lever 2 is displaced in clockwise direction such that the pivoted lever 2 runs with its entire lift path 11 over the valve opener 12 and, following this, the additional lift of the additional cam elevation 16 is also transmitted.

Figure 2:
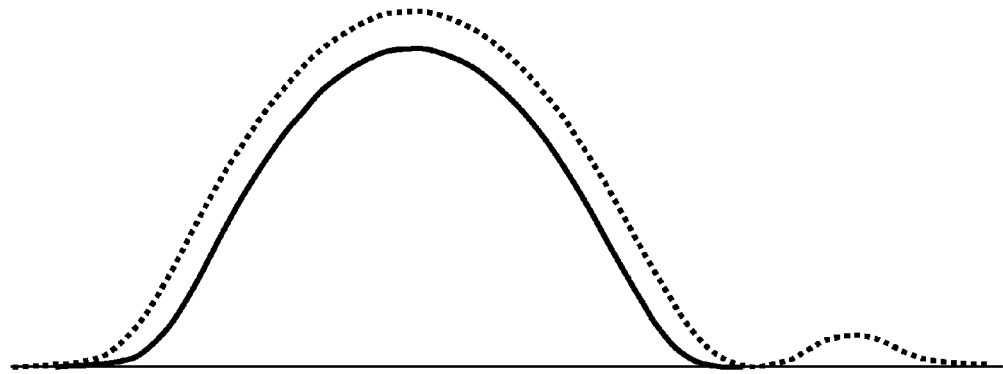
FIGS. 2 and 3 show schematic valve lift curves plotted against the cam angle.

For deactivating the additional lift and realizing a high valve lift (s. also FIG. 2), the pivoted lever 2 is turned by the adjusting device 15 so that during the base circle phase 17 of the lift cam 13, the zero lift shutting off surface 19 is in contact with the valve opener 12 and that, as a result, the valve opener 12 is not scanned by the entire lift path 11 of the transmission surface 4. The lift of the additional cam elevation 16 is thus suppressed ("swallowed").

LIST OF REFERENCE NUMERALS

1 Valve train
2 Pivoted lever
3 One end
4 Transmission surface
5 Central region
6 Counter running surface
7 Further end
8 Support element
9 Contact element
10 Zero lift path
11 Lift path
12 Valve opener
13 Lift cam
14 Lever guide path
15 Adjusting device
16 Actuable element
17 Base circle cam
18 Zero lift activating section
19 Zero lift shutting off section
20 Residual zero lift section
21 Gas exchange valve

The invention claimed is:

1. A variable lift valve train for an internal combustion engine with internal combustion, comprising a pivoted lever including a transmission surface on one end, a counter running surface in a central region and, on a further end, a support element and a contact element, said transmission surface comprising a zero lift path and, adjoining said zero lift path in a lever pivoting direction, a lift path, said transmission surface being in contact with a valve opener, said counter running surface being loaded by at least one lift cam, said support element being guided on a lever guide path, and said contact element, for adjusting a valve lift being loaded by an adjusting device in direction of said lever guide path, and the valve train includes an actuable element for creating an additional valve lift during a base circle phase of the lift cam that directly contacts the central region of the pivoted lever, wherein the cam base circle of the lift cam comprises at least one additional cam elevation as the actuable element for creating the additional valve lift, said zero lift path, as viewed from the lift path, being made up of a zero lift activating section, a zero lift shutting off section and a residual zero lift section and, for actuating the additional valve lift and creating a maximum valve lift, the pivoted lever is turned by the adjusting device only so far at a center of pivot of the adjusting device arranged on the further end that during the base circle phase of the lift cam the zero lift activating surface is in contact with the valve opener, and for deactivating the additional lift and realizing a high valve lift, the pivoted lever is turned by the adjusting device beyond the zero lift activating surface so far at a center of pivot of the adjusting device arranged on the further end that during the base circle phase of the lift cam, the zero lift shutting off surface is in contact with the valve opener.

2. A valve train according to claim 1, wherein the counter running surface, the support element and the contact element of the pivoted lever are all made either as a rotating roller or as a sliding surface.

3. A valve train according to claim 1, wherein the adjusting device is a segment-like oscillating eccentric part and is connected to the internal combustion engine.

4. A valve train according to claim 1, wherein the valve opener is configured as a lever-type cam follower, a finger lever, or an oscillating lever.

5. A valve train according to claim 1, wherein the valve train is used for an internal exhaust gas return when the additional valve lift is activated.

6. A valve train according to claim 5, wherein the internal exhaust gas return is used in a quality-regulated internal combustion engine.

* * * * *